(12) United States Patent
Petrik et al.

(10) Patent No.: US 9,400,017 B2
(45) Date of Patent: Jul. 26, 2016

(54) BUSHING ARRANGEMENT FOR CENTRING TWO SHAFT PORTIONS TO BE CONNECTED

(71) Applicant: SUEDDEUTSCHE GELENKSCHEIBENFABRIK GMBH & CO. KG, Waldkraiburg (DE)

(72) Inventors: Stephan Petrik, Haag/Winden (DE); Josef Stubenrauch, Rott (DE); Bernd Scheper, Reichertsheim (DE); Franz Kobus, Jettenbach (DE)

(73) Assignee: SUEDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 0 days.

(21) Appl. No.: 14/331,254

(22) Filed: Jul. 15, 2014

(65) Prior Publication Data

US 2015/0016868 A1    Jan. 15, 2015

(30) Foreign Application Priority Data

Jul. 15, 2013  (DE) .................... 20 2013 006 359 U

(51) Int. Cl.
*F16C 11/08* (2006.01)
*F16D 3/76* (2006.01)
*F16D 3/50* (2006.01)
*F16F 1/38* (2006.01)

(52) U.S. Cl.
CPC ............... *F16D 3/76* (2013.01); *F16C 11/083* (2013.01); *F16D 3/50* (2013.01); *F16D 2300/08* (2013.01); *F16F 1/3835* (2013.01); *Y10T 403/32622* (2015.01); *Y10T 403/451* (2015.01)

(58) Field of Classification Search
CPC . B60G 2204/4102; F16C 11/04; F16C 11/08; F16C 11/083; F16C 11/086; F16C 11/12; F16D 1/06; F16D 3/50; F16D 3/76; F16D 3/78; F16F 1/38; F16F 1/3835
USPC ......... 403/120, 121, 221, 223, 225, 226, 228, 403/291, 372; 464/89, 92–96
See application file for complete search history.

(56) References Cited

U.S. PATENT DOCUMENTS

| 2,396,353 A * | 3/1946 | Venditty ........................ 403/228 |
| 2,719,017 A * | 9/1955 | Spencer .................... F16F 1/38 403/226 |
| 3,140,081 A * | 7/1964 | Peterson ........................ 403/228 |
| 4,182,139 A * | 1/1980 | Hornig et al. ................... 464/55 |

(Continued)

FOREIGN PATENT DOCUMENTS

| DE | 19531201 A1 * | 2/1997 | ................ F16D 3/50 |
| WO | 2004/097239 A1 | 11/2004 | |

*Primary Examiner* — Josh Skroupa
(74) *Attorney, Agent, or Firm* — Carter, DeLuca, Farrell & Schmidt, LLP

(57) ABSTRACT

A bushing arrangement for centring two shaft portions to be connected, having at least one outer bushing, and at least one inner bushing arranged radially inwards of the at least one outer bushing, the at least one outer bushing and the at least one inner bushing being connected via at least one elastomer body, on which at least one sealing lip is formed. At least one encircling recess is formed in the elastomer body which extends from one axial end of the bushing arrangement in such a manner into the elastomer body that the at least one recess extends radially around the at least one sealing lip and around at least a portion of the axial extent of the inner bushing.

17 Claims, 6 Drawing Sheets

(56) References Cited

U.S. PATENT DOCUMENTS

| | | | |
|---|---|---|---|
| 5,190,269 A * | 3/1993 | Ikeda et al. | 403/225 |
| 5,769,380 A * | 6/1998 | Hibi et al. | 267/141.2 |
| 5,887,859 A * | 3/1999 | Hadano et al. | 267/141.1 |
| 6,068,555 A | 5/2000 | Andra et al. | |
| 7,083,521 B2 * | 8/2006 | Takei | 464/93 |
| 7,250,002 B2 * | 7/2007 | Kotsusa | 464/93 |
| 7,540,478 B2 * | 6/2009 | de Fontenay et al. | 267/140.12 |
| 7,740,236 B2 * | 6/2010 | Martin | 403/226 |
| 2007/0080534 A1 * | 4/2007 | Rothe et al. | 285/222.1 |

* cited by examiner

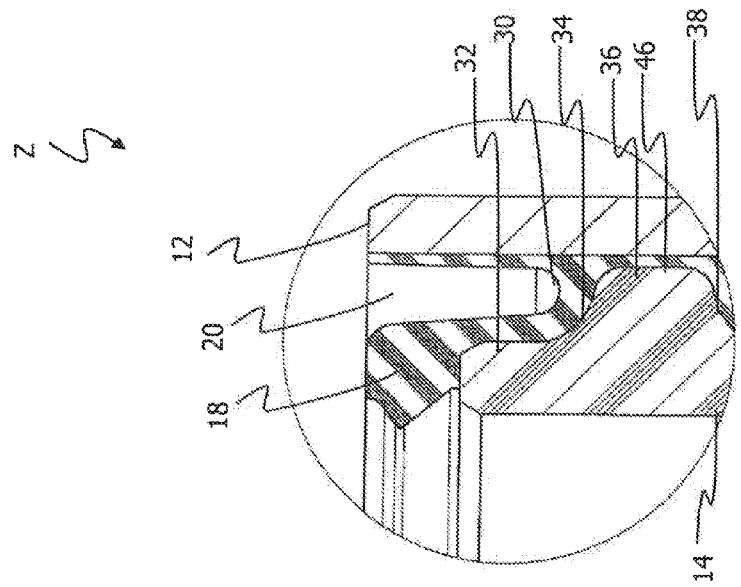
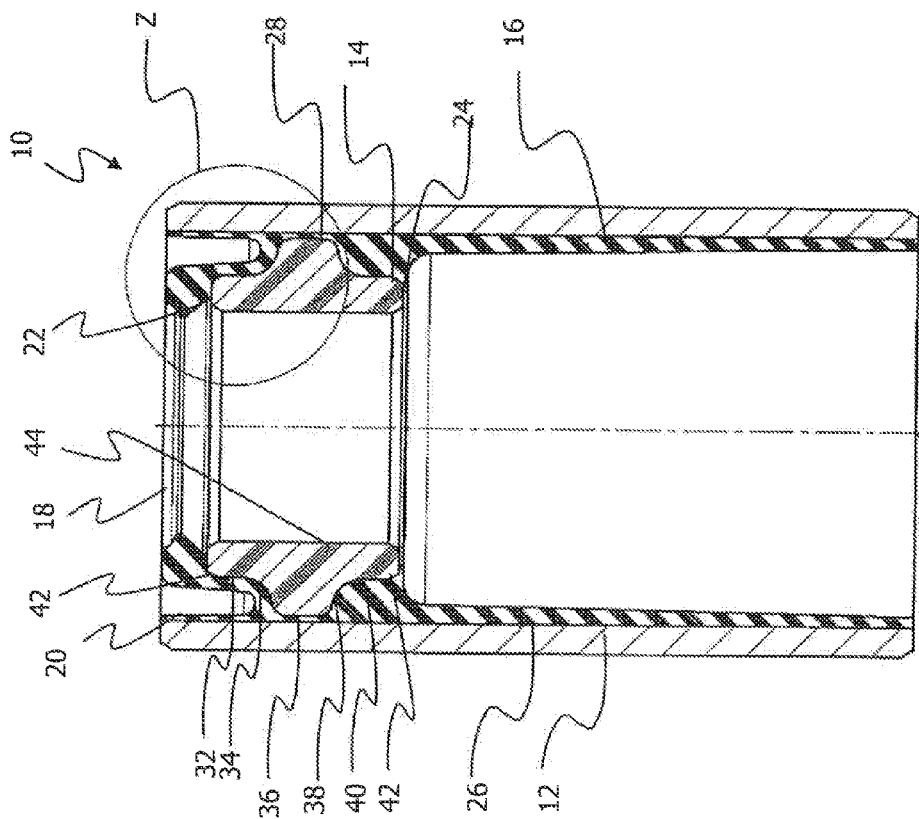

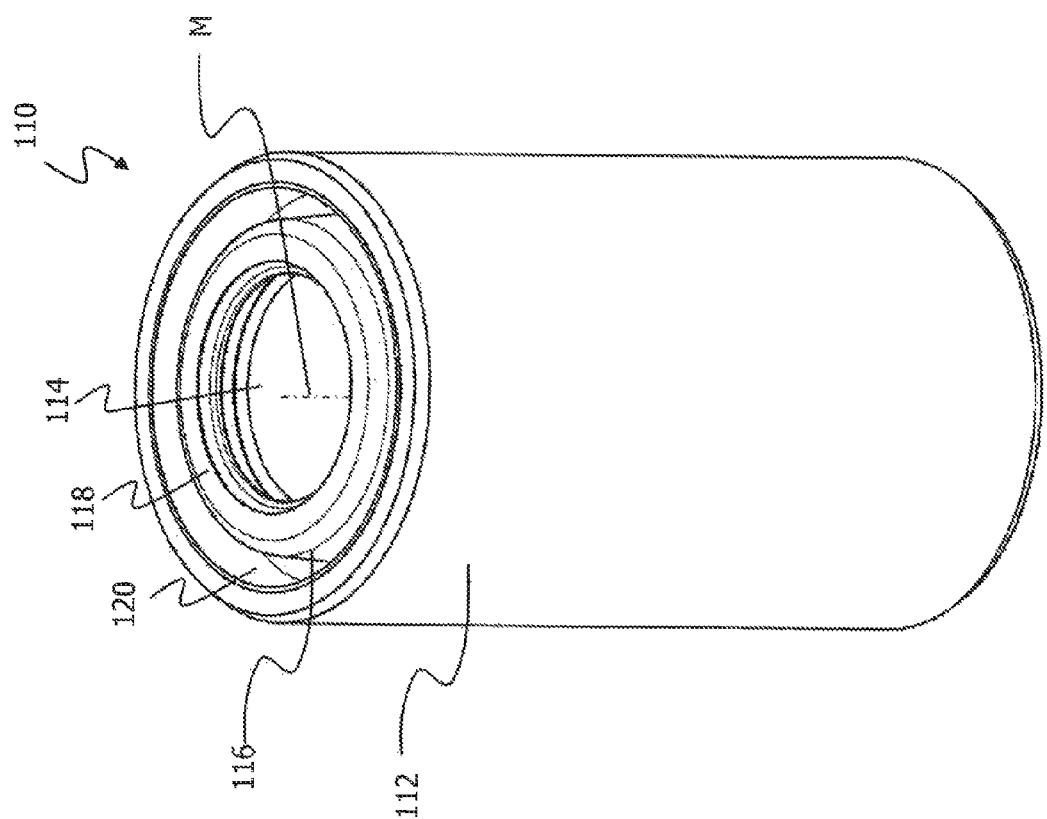

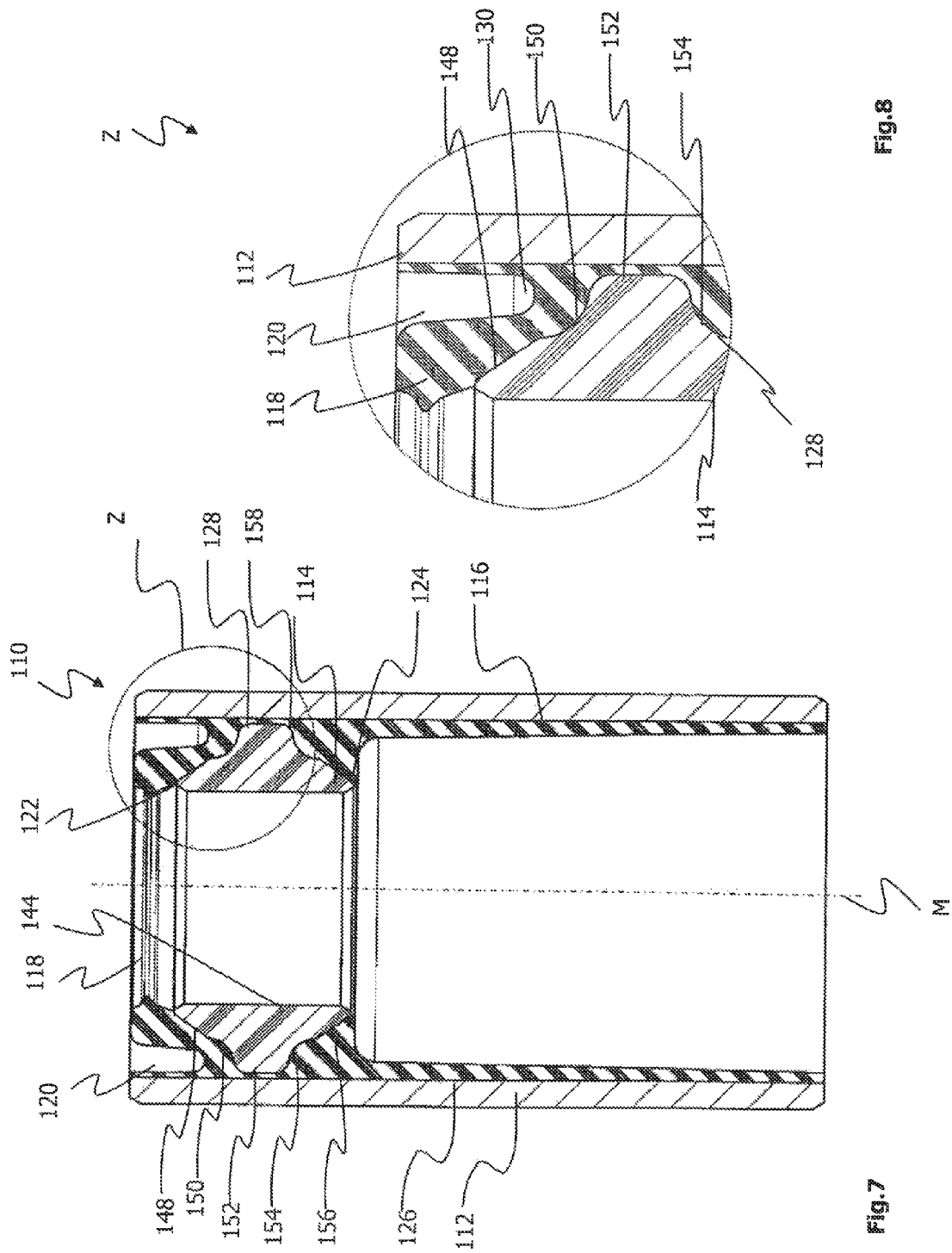

BUSHING ARRANGEMENT FOR CENTRING TWO SHAFT PORTIONS TO BE CONNECTED

The present invention relates to a bushing arrangement for centring two shaft portions to be connected, having at least one outer bushing and at least one inner bushing arranged radially inwards of the at least one outer bushing. The at least one outer bushing and the at least one inner bushing are connected via at least one elastomer body, on which at least one sealing lip is formed.

Bushing arrangements of this kind are known from the prior art and disclosed, for example, in the documents DE 195 31 201 A1 and WO 2004/097239 A1.

The document DE 195 31 201 A1 discloses a centring device having a sleeve-shaped centring collar, to which a rubber spring arrangement is fastened. The rubber spring arrangement extends between the centring collar and an inner bushing which can guide a centring pin. The rubber spring arrangement surrounds the inner bushing and comprises a sealing lip. Adjacent to the sealing lip, the rubber spring arrangement completely fills the radial region between the centring collar and the inner bushing.

WO 2004/097239 A1 discloses a bearing having a tubular piece and an insert inserted into the tubular piece. The central insert is embedded in an elastic centring sleeve made of rubber and is vulcanised onto this sleeve. On the centring sleeve there is formed a first annular sealing lip and a second annular sealing lip. Between the two sealing lips, the elastic centring sleeve completely fills the radial region between the tubular piece and the central insert.

The devices for centring two shaft portions to be connected known from the prior art are employed frequently and have proved to be perfectly suitable in practice.

It has been found, however, that through further developments for example in steering shafts and drive trains in the automotive sector, relatively large bending angles, i.e. greater than 3°, occur more frequently between the shaft portions to be connected.

The applicant has discovered that at larger bending angles the sealing lip may possible lift off from e.g. a centring pin, with the result that the sealing function of the centring device or bushing arrangement may be impaired.

It is accordingly an object of the present invention to further develop a bushing arrangement of the kind described at the outset in such a manner that it safely and reliably performs its function also at relatively large bending angles.

This object is achieved by a device for centring two shaft portions to be connected, having the features of claim 1.

Further embodiments of the invention will become apparent from the appended subclaims.

In the case of the bushing arrangement for centring two shaft portions to be connected according to the invention, there is formed in the elastomer body at least one encircling recess. The encircling recess extends from one axial end of the bushing arrangement in such a manner into the elastomer body that the at least one recess extends radially around the at least one sealing lip and around at least a portion of the axial extent of the inner bushing.

The axial extent of the inner bushing is understood, in this context, to mean the length of the inner bushing in the direction of the centre axis of the bushing arrangement. Accordingly, the encircling recess in the elastomer body overlaps at least an axial portion of the inner bushing.

As a result of the recess in the elastomer body which radially surrounds the at least one sealing lip and at least an axial portion of the inner bushing, the sealing lip and the inner bushing can be largely uncoupled from the outer bushing. The sealing lip is coupled to the inner bushing and can follow its movement. This has the advantage that, at relatively large bending angles for the application in steering shafts or drive trains, i.e. at bending angles in a range from 4-5°, the sealing lip follows the movement of the inner bushing and is not lifted off from the inner bushing, with loss of its sealing action, through its attachment to the outer bushing. The sealing lip and also the inner bushing are thus largely independent of the outer bushing in their movement. Accordingly, the sealing lip can safely and reliably perform its sealing function also at relatively larger bending angles.

According to an embodiment of the invention, the at least one recess in the elastomer body can run at least partially between the lateral surface of the inner bushing and the inner circumferential surface of the outer bushing. With such a design of the recess, the uncoupling of the sealing lip and also the inner bushing from the outer bushing can be promoted and the sealing lip can be prevented from being lifted off at larger bending angles.

According to a development of the invention, an axial end region of the at least one recess can be radially enclosed between the inner bushing and the outer bushing. The recess ends in a region of the elastomer body which is located radially between the inner bushing and the outer bushing.

In order to achieve a guided movement between the outer bushing and the inner bushing in the event of bending loads of the bushing arrangement due to the shaft portions to the be connected and in order not to allow excessive deflections in the radial direction between the inner bushing and the outer bushing, according to a development of the invention it can be provided that the at least one inner bushing has an encircling portion protruding in the direction of the outer bushing. The inner bushing can be supported on the outer bushing via the protruding portion and the elastomer body provided between the inner bushing and the outer bushing.

According to an embodiment of the invention, the at least one recess in the elastomer body can extend up to the portion of the at least one inner bushing protruding in the direction of the outer bushing, i.e. the portion of the inner bushing protruding in the direction of the outer bushing delimits the recess in the elastomer body in the axial direction.

The at least one recess can extend into the elastomer body substantially parallel to the inner circumferential surface of the outer bushing. Put another way, the recess extends in a direction parallel to the centre axis of the bushing arrangement.

In order to promote the uncoupling of the sealing lip from the outer bushing and in order to better attach the sealing lip to the inner bushing, the lateral surface of the inner bushing can have a predetermined contour. Thus, according to an embodiment of the invention, it can be provided that the lateral surface of the inner bushing, viewed in the axial direction, comprises a portion which runs parallel to the centre axis and which is connected via a curved portion to the portion protruding in the direction of the outer bushing. The protruding portion can be adjoined by a further curved portion which merges into a portion running parallel to the centre axis of the bushing arrangement. There can be provided at the axial ends of the inner bushing in each case a chamfer. In other words, between the portions running parallel to the centre axis of the bushing arrangement, and the end faces of the inner bushing, there can be formed in each case a chamfer.

Alternatively to the embodiment described above, the lateral surface of the inner bushing can also be contoured differently. According to a further embodiment of the invention, the lateral surface of the inner bushing, viewed in the axial direction, can comprise a linear portion which runs at an angle to the centre axis and which is adjoined by a curved portion. The curved portion can merge into the portion protruding in the direction of the outer bushing. The protruding portion is connected via a curved portion to a linear portion running at an angle to the centre axis of the bushing arrangement.

With such a configuration of the inner bushing, it is conceivable for the inner bushing to have no end faces or only very small end faces.

According to a development of the invention, the lateral surface of the inner bushing can be completely surrounded by the elastomer body.

It can further be provided that the elastomer body at least partially covers the end faces of the inner bushing. A connection between the bushings and the elastomer body is usually produced via an adhesion promoter. In this case, it is also conceivable for the end faces of the inner bushing to be provided with an adhesion promoter for the attachment of the elastomer body.

Preferably, the inner circumferential surface of the outer bushing can be completely covered by the elastomer body.

According to an embodiment of the invention, the sealing lip and the inner bushing can be provided in an axial end region of the outer bushing. It is accordingly possible for the sealing lip and the inner bushing not to be arranged centrally in the outer bushing, but offset at an axial end region of the outer bushing.

According to a development of the invention, the at least one recess in the at least one elastomer body can radially surround approximately between 10 and 40% of the axial extent of the inner bushing.

The present invention further relates to a centring device having a bushing arrangement of the kind described above.

Furthermore, the present invention relates to a torque transmission device having a bushing arrangement described above.

Embodiments of the present invention are described below with reference to the appended figures, in which:

FIG. 3 shows an axis-containing sectional view of the bushing arrangement according to the first embodiment of the invention;

FIG. 4 shows an enlarged detail view of the detail Z in FIG. 3;

FIG. 5 shows a perspective view of a bushing arrangement according to a second embodiment of the invention;

FIG. 7 shows an axis-containing sectional view of the bushing arrangement according to the second embodiment of the invention; and FIG. 8 shows a detail view of the detail Z in FIG. 7.

FIG. 1 shows a perspective view of a bushing arrangement according to a first embodiment of the invention, which is designated generally by 10.

Figure 1:
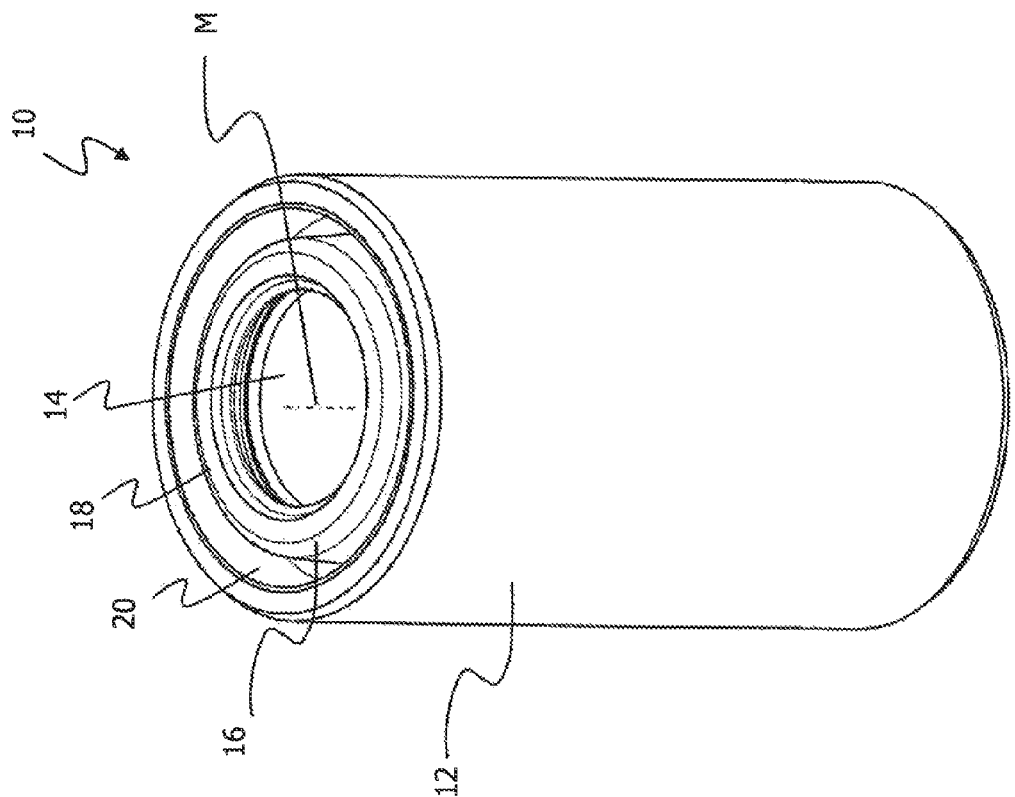
FIG. 1 shows a perspective view of a bushing arrangement according to a first embodiment of the present invention.

The bushing arrangement 10 comprises an outer bushing 12 and an inner bushing 14, which is only partially visible in FIG. 1. The outer bushing 12 and the inner bushing 14 are connected to one another via an elastomer body 16. On the elastomer body 16 there is formed a sealing lip 18 which adjoins the inner bushing 14 in the direction of the centre axis M of the bushing arrangement 10. The sealing lip 18 is intended for sealingly bearing against, for example, a centring pin (not shown) of a centring device.

In FIG. 1 there can be seen in outline the recess 20 which extends into the elastomer body 16 in the axial direction of the centre axis M, in order to uncouple the sealing lip 18 from the outer bushing 12.

The outer bushing 12 is of tubular form and surrounds the inner bushing 14 and the elastomer body 16 radially.

Figure 2:
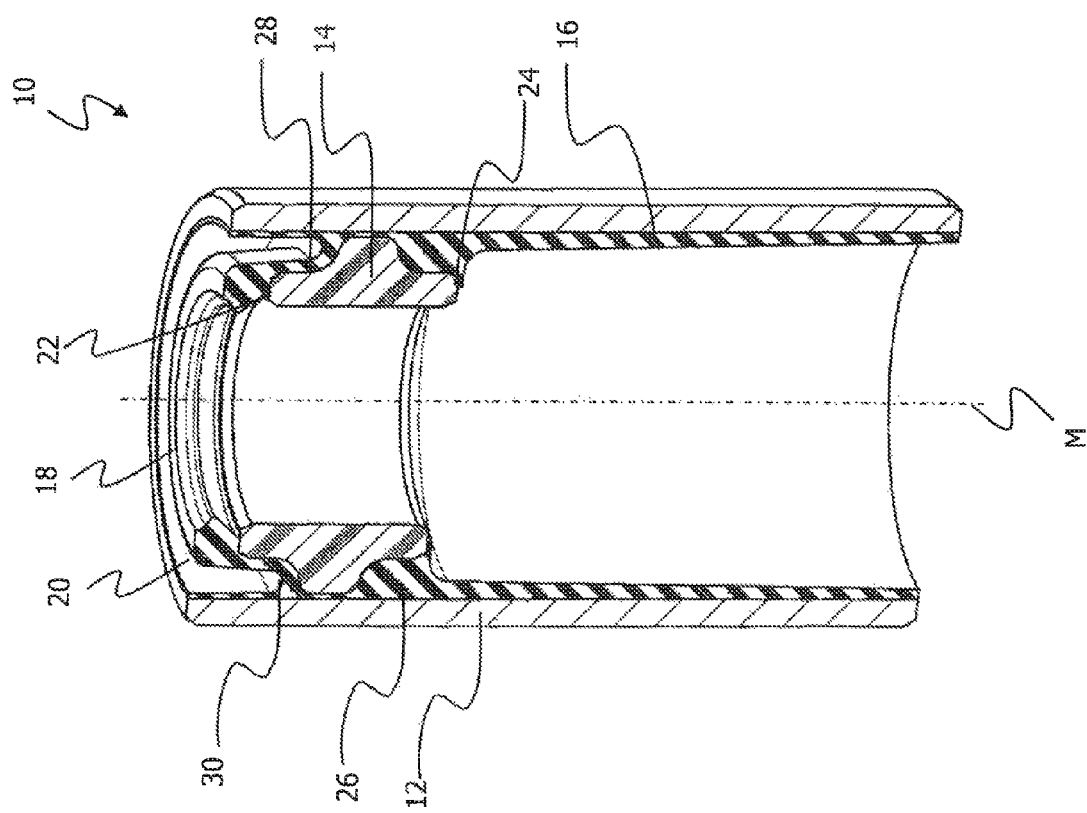
FIG. 2 shows a perspective, axis-containing sectional view of the bushing arrangement according to the first embodiment of the invention.

FIG. 2 shows an axis-containing, perspective view of the bushing arrangement 10.

The outer bushing 12 is connected to the inner bushing 14 via the elastomer body 16. The inner bushing 14 has two axial end faces 22 and 24. The sealing lip 18 adjoins the end face 22 in the axial direction. The sealing lip 18 and the inner bushing 14 are arranged in an axial end region of the outer bushing 12, i.e. are not provided centrally in the outer bushing 12.

The recess 20 extends into the elastomer body 16 in the axial direction, starting from an axial end of the outer bushing 12, the recess 20 running parallel to an inner circumferential surface 26 of the outer bushing 12. The recess 20 radially surrounds the sealing lip 18 and a portion of the extent of the inner bushing 14 in the direction of the centre axis M of the bushing arrangement 10. In other words, the recess 20 extends partially between the inner circumferential surface 26 of the outer bushing 12 and the lateral surface 28 of the inner bushing 14, i.e. the axial end 30 of the recess 20 in the elastomer body 16 is radially enclosed between the inner circumferential surface 26 of the outer bushing 12 and the lateral surface 28 of the inner bushing 14.

The elastomer body 16 is connected to the lateral surface 28 of the inner bushing 14 and also partially extends over the end faces 22 and 24 of the inner bushing 14.

Optionally, the elastomer body 16 can also be connected to the end faces 22 and 24 of the inner bushing 14 or attached to these end faces 22 and 24. For the attachment of the elastomer body 16 to the outer bushing 12 and the inner bushing 14, firstly an adhesion promoter is applied and subsequently the elastomer body 16 is vulcanised onto the inner circumferential surface 26 of the outer bushing 12 and onto the lateral surface 28 of the inner bushing 14.

The elastomer body 16 is provided over the entire inner circumferential surface 26 of the outer bushing 12, i.e. a thin elastomer layer extends over the inner circumferential surface 26 of the outer bushing 12 also in the region of the recess 20.

FIG. 3 shows an axis-containing sectional view of the bushing arrangement 10.

The inner bushing 14 or its lateral surface 28 has a predetermined contour. Starting from the end face 22, there is provided a portion 32 which extends parallel to the centre axis M and which is connected via a curved portion 34 to a portion 36 protruding in the direction of the outer bushing 12. The protruding portion 36 in turn is connected to a curved portion 38 which merges into a portion 40 running linearly with respect to the centre axis M. At the end faces 22 and 24 or at the transitions of the end faces 22 and 24 to the portions 34 and 40 running parallel to the centre axis M, there is provided in each case an encircling chamfer 42.

In FIG. 3 it becomes clear that the sealing lip 18 protrudes radially further in the direction of the centre axis M than the inner circumferential surface 44 of the inner bushing 14. The reason for this is that the sealing lip 18 is intended to seal off the bushing arrangement 10, for example, with respect to a centring pin (not shown).

Both the outer bushing 12 and the inner bushing 14 is a rotationally symmetrical body.

In the event of bending loads but also in the event of deflections in the radial direction, the inner bushing 14 can be supported on the outer bushing 12 or its inner circumferential surface 26, via the portion 36 protruding in the direction of the outer bushing 12.

FIG. 4 shows an enlarged detail view of the detail Z in FIG. 3.

From the enlarged view according to FIG. 4, it becomes clear that the recess 20 radially surrounds both the sealing lip 18 and the portion 32 (see also FIG. 3) of the inner bushing 14 running parallel to the centre axis M. The recess 20 extends almost up to the protruding portion 36 of the inner bushing 14, i.e. the recess 20 ends approximately at the level of the curved portion 34. The protruding portion 36 delimits the recess 20 in the elastomer body 16 in the axial direction.

An elastomer layer of the elastomer body 16 on the inner circumferential surface 26 of the outer bushing 12 is approximately of the same thickness in the region of the recess 20 as the elastomer layer between the end surface 46 of the protruding portion 36 and the inner circumferential surface 26 of the outer bushing 12.

The sealing lip 18 extends over a relatively large region of the end face 22, i.e. a small region of the end face 22 is not covered by the sealing lip 18 or the elastomer body 16.

From an overall view of FIGS. 1 to 4, it can be seen that the recess 20 radially surrounds the sealing lip 18 and the inner bushing 14 up to the transition of the portion 32 to the portion 34. As a result, the sealing lip 18 is mechanically uncoupled from the outer bushing 12. Owing to the recess 20, the sealing lip 18 can follow the movement of the inner bushing 14 in the event of bending loads and the sealing lip 18 can be effectively prevented from lifting off from the inner bushing 14 and, for example, from a centring pin (not shown).

A further embodiment of the present invention is described below. For components of the same kind and of the same function, the same reference symbols are used but preceded by the numeral "1".

FIG. 5 shows a perspective view of the bushing arrangement 110 according to a second embodiment of the invention.

The bushing arrangement 110 comprises an outer bushing 112 and an inner bushing 114 which are connected to one another via an elastomer body 116. On the elastomer body 116 there is formed a sealing lip 118 which adjoins the inner bushing 114 in the axial direction.

Figure 6:
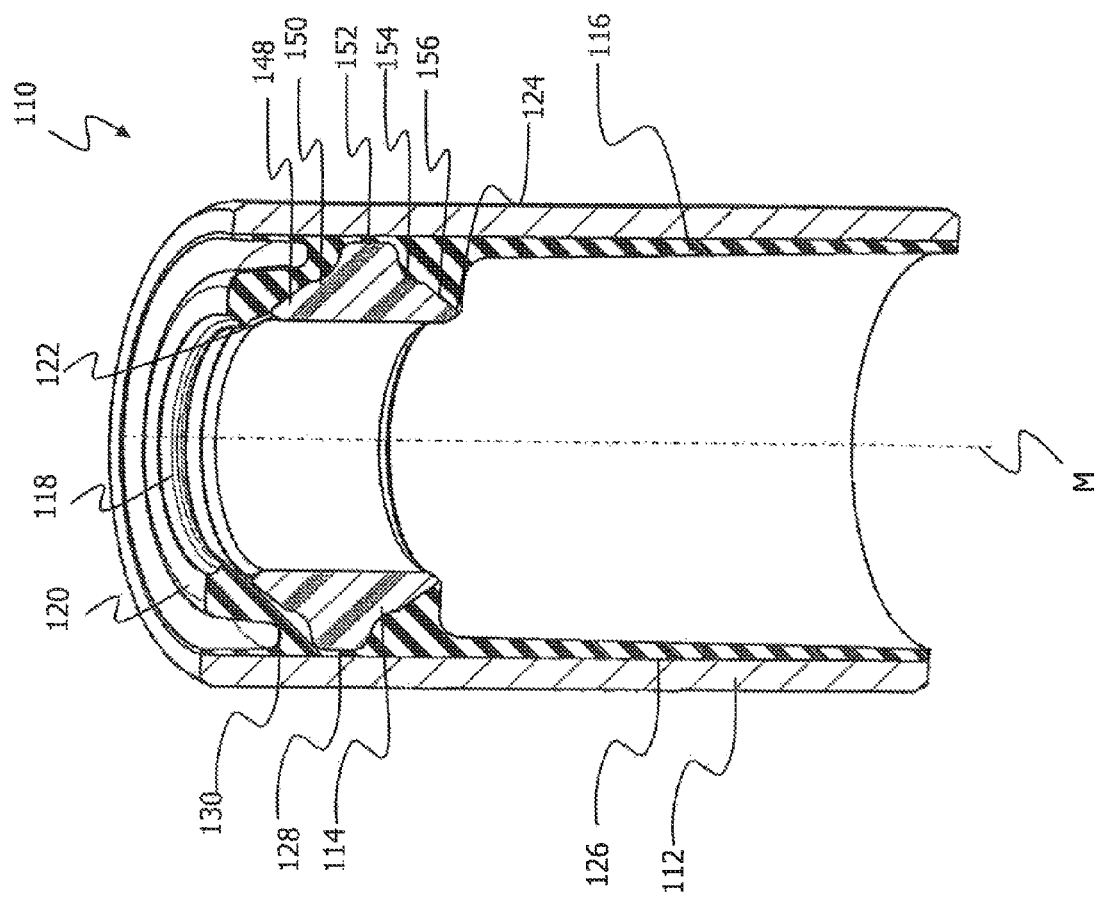
FIG. 6 shows a perspective, axis-containing sectional view of the bushing arrangement according to a second embodiment of the invention.

FIG. 6 shows an axis-containing sectional view of the bushing arrangement 110. Compared with the embodiment described with reference to FIGS. 1 to 14, the lateral surface 128 of the inner bushing 114 according to this embodiment has a different contour. The inner bushing 114 according to this embodiment has end faces 122 and 124 which are of only very thin form in the radial direction, i.e. reduced compared with the embodiment described above.

Starting from the end face 122, the inner bushing 114, viewed in the axial direction, has a linear portion 148 which runs at an angle to the centre axis M and adjoining which is a curved portion 150. The curved portion 150 merges into a portion 152 protruding in the direction of the outer bushing 112. The protruding portion 152 is connected via the curved portion 154 to a portion 156 which is linear, but runs at an angle to the centre axis M of the bushing arrangement 110. In other words, the inner bushing 114 according to this embodiment is provided with oblique portions 148 and 156 and considerably smaller end faces 122 and 124.

The recess 120 extends into the elastomer body 116 in the axial direction, starting from an axial end of the outer bushing 112. The recess 120 radially surrounds the sealing lip 118 and the portion 148 of the inner bushing 114, i.e. the portion 148 of the axial extent of the inner bushing 114.

FIG. 7 shows a sectional view of the bushing arrangement 110. The lateral surface 128 of the inner bushing 114 has the oblique portion 148, the curved portion 150, the portion 152 protruding in the direction of the outer bushing, the curved portion 154 and the portion 156 running at an angle to the centre axis M or obliquely.

From FIG. 7, it can now be clearly seen that the recess 120 radially surrounds the sealing lip 118 and the portion 148 of the inner bushing 114. The inner bushing 114 can be supported via the elastomer body 116 on the inner circumferential surface 126 of the outer bushing 112 via the protruding portion 152 or the surface 158 of the latter. The elastomer body 116 extends over the lateral surface 128 of the inner bushing 114 completely.

As in the first embodiment, a thin elastomer layer of the elastomer body 116 extends over the region of the inner circumferential surface 126 of the outer bushing 112 in which the inner bushing 114 and the sealing lip 118 are not arranged. In the region of the inner circumferential surface 126 in which the inner bushing 114 is arranged, the elastomer body 116 connects the lateral surface 128 of the inner bushing 114 to the inner circumferential surface 126 of the outer bushing 112.

FIG. 8 shows an enlarged partial view of the detail Z in FIG. 7.

In FIG. 8 there can be seen the obliquely running portion 148 of the lateral surface 128 of the inner bushing 114.

The recess 120 extends into the elastomer body 116 to such an extent in the axial direction that it can radially surround the portion 148 of the lateral surface 128 of the inner bushing 114. The recess 120 extends in the axial direction approximately up to the transition of the oblique portion 148 to the curved portion 150 or ends at this transition.

As a result, the sealing lip 118 is mechanically uncoupled from the outer bushing 112. Owing to the recess 120, the sealing lip 118 can follow the movement of the inner bushing 114 in the event of bending loads and the sealing lip 118 can be effectively prevented from lifting off from the inner bushing 114.

The invention claimed is:

1. A bushing arrangement for centring two shaft portions to be connected, comprising:
    at least one outer bushing having a first axial end face and a second axial end face; and
    at least one inner bushing arranged radially inwards of the at least one outer bushing, wherein the at least one inner bushing is disposed between the first axial end face and the second axial end face of the at least one outer bushing such that the at least one inner bushing is axially offset from a halfway point between the first axial end face and the second axial end face of the at least one outer bushing,
    the at least one outer bushing and the at least one inner bushing being connected via at least one elastomer body, on which at least one sealing lip is formed, wherein at least one encircling recess formed in the elastomer body extends from one axial end of the bushing arrangement in such a manner into the elastomer body that the at least one encircling recess radially surrounds the at least one sealing lip and radially surrounds at least a portion of an axial extent of the inner bushing, wherein the at least one sealing lip adjoins the inner bushing in a direction of a central axis of the bushing arrangement.

2. The bushing arrangement according to claim 1, wherein the at least one encircling recess in the elastomer body runs at least partially between a lateral surface of the inner bushing and an inner circumferential surface of the outer bushing.

3. The bushing arrangement according to claim 1, wherein an axial end region of the at least one encircling recess is radially enclosed between the inner bushing and the outer bushing.

4. The bushing arrangement according to claim 1, wherein the at least one inner bushing has an encircling portion protruding in the direction of the outer bushing.

5. The bushing arrangement according to claim 4, wherein the at least one encircling recess in the elastomer body extends up to a portion of the at least one inner bushing protruding in the direction of the outer bushing.

6. The bushing arrangement according to claim 1, wherein the at least one encircling recess extends into the elastomer body substantially parallel to an inner circumferential surface of the outer bushing.

7. The bushing arrangement according to claim 1, wherein a lateral surface of the inner bushing, viewed in an axial direction, comprises a portion which runs parallel to the central axis and which is connected via a curved portion to a portion protruding in a direction of the outer bushing, the protruding portion being adjoined by a further curved portion which merges into a portion running parallel to the central axis of the bushing arrangement, there being provided at axial ends of the inner bushing in each case a chamfer.

8. The bushing arrangement according to claim 1, wherein a lateral surface of the inner bushing, viewed in an axial direction, comprises a linear portion which runs at an angle to the central axis and which is adjoined by a curved portion which merges into a portion protruding in a direction of the outer bushing, the protruding portion being connected via a curved portion to a linear portion running at an angle to the central axis of the bushing arrangement.

9. The bushing arrangement according to claim 1, wherein a lateral surface of the inner bushing is completely surrounded by the elastomer body.

10. The bushing arrangement according to claim 1, wherein the elastomer body at least partially covers end faces of the inner bushing.

11. The bushing arrangement according to claim 1, wherein an inner circumferential surface of the outer bushing is completely covered by the elastomer body.

12. The bushing arrangement according to claim 1, wherein the at least one sealing lip and the inner bushing are provided at an axial end region of the outer bushing.

13. The bushing arrangement according to claim 1, wherein the at least one encircling recess in the at least one elastomer body radially surrounds approximately between 10 and 40% of an axial extent of the inner bushing.

14. A centring device having a bushing arrangement according to claim 1.

15. A torque transmission device having a bushing arrangement according to claim 1.

16. The bushing arrangement according to claim 1, wherein the inner bushing includes a first axial end face and a second axial end face, the sealing lip adjoining the inner bushing at the first axial end face.

17. The bushing arrangement according to claim 16, wherein the sealing lip does not adjoin the inner bushing at the second axial end face.

* * * * *